(12) United States Patent
Ayyangar

(10) Patent No.: US 8,451,846 B1
(45) Date of Patent: May 28, 2013

(54) LSP HIERARCHY FOR MPLS NETWORKS

(75) Inventor: Arthi Ayyangar, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 879 days.

(21) Appl. No.: 11/379,300

(22) Filed: Apr. 19, 2006

(51) Int. Cl.
*H04L 12/56* (2006.01)

(52) U.S. Cl.
USPC .................. 370/395.5; 370/401; 370/466

(58) Field of Classification Search
None
See application file for complete search history.

(56) References Cited

U.S. PATENT DOCUMENTS

| | | | |
|---|---|---|---|
| 6,842,788 B1 | 1/2005 | Ghanwani et al. | 709/238 |
| 6,862,288 B2 | 3/2005 | Sharma et al. | 370/403 |
| 7,478,167 B2* | 1/2009 | Ould-Brahim et al. | 709/238 |
| 7,529,257 B1* | 5/2009 | Tappan | 370/409 |
| 2003/0081589 A1* | 5/2003 | Marian et al. | 370/351 |
| 2003/0161264 A1* | 8/2003 | Ho et al. | 370/229 |
| 2003/0174706 A1* | 9/2003 | Shankar et al. | 370/393 |
| 2005/0141504 A1* | 6/2005 | Rembert et al. | 370/392 |
| 2005/0180431 A1* | 8/2005 | Kinoshita et al. | 370/397 |
| 2006/0067298 A1* | 3/2006 | Houck et al. | 370/352 |
| 2006/0291391 A1* | 12/2006 | Vasseur et al. | 370/235 |
| 2007/0058568 A1* | 3/2007 | Previdi et al. | 370/254 |
| 2007/0133406 A1* | 6/2007 | Vasseur | 370/230 |

OTHER PUBLICATIONS

Pan, P. et al, Request for Comment 4090, Fast Reroute Extensions to RSVP-TE for LSP Tunnels, May 2005.*
"RFC 2702—Requirements for Traffic Engineering over MPLS", D. Awduche et al., Sep. 1999, 30 pages.
K. Kompella at al., "LSP Hierarchy with MPLS TE", Network Working Group, Internet Draft, Feb. 2001, 12 pages.
"RFC 3209—RSVP-TE: Extensions to RSVP for LSP Tunnels", D. Awduch et al., Dec. 2001, 62 pages.
"RFC 3471—Generalized Multi-Protocol Label Switching (GMPLS) Signaling Functional Description", L. Berger, Jan. 2003, 34 pages.
"RFC 3473—Generalized Multi-Protocol Label Switching (GMPLS) Signaling Resource Reservation Protocol-Traffic Engineering (RSVP-TE) Extensions", L. Berger, Jan. 2003, 29 pages.
"RFC 4090—Fast Reroute Extensions to RSVP-TE for LSP Tunnels", P. Pan et al., May 2005, 39 pages.
"RFC 4206—Label Switched Paths (LSP) Hierarchy with Generalized Multi-Protocol Label Switching (GMPLS) Traffic Engineering (TE)", K. Kompella at al., Oct. 2005, 15 pages.
Francois Le Faucheur et al., "Aggregation of RSVP Reservations over MPLS TE/DS-TE Tunnels"; Internet Draft, Cisco Systems, Inc., Feb. 2006, 29 pages.

* cited by examiner

*Primary Examiner* — Faruk Hamza
*Assistant Examiner* — Tito Pham
(74) *Attorney, Agent, or Firm* — Harrity & Harrity, LLP

(57) ABSTRACT

A system may define a first region that includes a first colored link of a multiprotocol label switching (MPLS) network, and may define a second region that includes a second colored link of the MPLS network. The system may define a boundary between the first and second regions based on the first colored link and the second colored link.

20 Claims, 12 Drawing Sheets

LSP HIERARCHY FOR MPLS NETWORKS

BACKGROUND

1. Field of the Invention

Implementations consistent with principles of the invention relate generally to data processing and, more particularly, to a label switched path (LSP) hierarchy for Multiprotocol Label Switching (MPLS) networks.

2. Description of Related Art

In a Multiprotocol Label Switching (MPLS) network, a signaling protocol may be used to set up a label switched path (LSP) in the MPLS network. MPLS may permit a network to direct a flow of datagrams along a predetermined path (e.g., a LSP) across the network. A "datagram(s)" may include any type or form of data, such as packet or non-packet data. As part of setting up the LSP, label switching routers (LSRs) included in the MPLS network may set up a label information base (LIB) which may map an incoming label from an input port of the LSR to an output port of the LSR and to a new label value. The LSRs may forward datagrams along links through the MPLS network based on labels attached to the datagrams that indicate which LSP to use. The label may be swapped to the new label at each router hop. In this way, a LSP may identify the specific path of nodes (e.g., routers) and links that the datagram takes through the MPLS network.

Generalized Multiprotocol Label Switching (GMPLS) may provide similar functionality as MPLS and some additional functionality. GMPLS may permit setting up LSPs in a packet switched network, and may generalize this notion to set up LSPs in non-packet switched networks traversing optical cross connects, synchronous optical network (SONET) cross connects, etc. Labels may be port numbers, lambdas, timeslots, etc. In order to support this flexibility, GMPLS extended the base signaling and routing protocols provided by MPLS.

GMPLS may allow a user to specify the start point, end point, and bandwidth required, and a GMPLS agent on the network elements may allocate the path through the network, provisioning the traffic path, setting up cross-connects, and allocating bandwidth from the paths for the user-requested service. The actual path that the traffic will take through the network is not specified by the user. However, many networks do not support GMPLS and only support MPLS.

Two kinds of LSPs that may be set up in a network running MPLS include control-driven LSPs and traffic engineered LSPs. A traffic engineered LSP through a network may be established using a signaling protocol such as RSVP-TE (resource reservation protocol with traffic engineering). RSVP may be used by either a host or routers to request or deliver specific qualities or services (QoS) for application data streams or flows. RSVP may define how applications place reservations and how they may relinquish the reserved resources once the need for them has ended.

A LSP hierarchy may permit nesting of one or more RSVP LSPs into another RSVP LSP called a Forwarding Adjacency LSP (FA-LSP). This may allow scaling of RSVP LSPs and reduce the control and forwarding plane state in the network. Unfortunately, a LSP hierarchy relies on GMPLS signaling and routing extensions that are not compatible with existing MPLS networks. Deploying a LSP hierarchy in a MPLS network would require that all routers in the network be upgraded to support GMPLS, a costly and time consuming network upgrade.

SUMMARY

According to one aspect, a method may include defining a first region by coloring a first link of a multiprotocol label switching (MPLS) network a first color, and defining a second region by coloring a second link of the MPLS network a second color. The method may also include defining a boundary between the first region and the second region based on the first link color and the second link color.

According to another aspect, a method may include determining if a link is within a first region or a second region of a multiprotocol label switching (MPLS) network. The first region may include a first link color, and the second region may include a second link color. The method may also include defining a boundary between the first region and the second region based on the first link color and the second link color.

According to yet another aspect, a method may include defining a boundary between first and second regions within a multiprotocol label switching (MPLS) network by coloring a link in the first region a first link color and by coloring a link in the second region a second link color. The method may also include using the boundary between the first and second regions to trigger creation of a forwarding adjacency label switched path (FA-LSP) within the second region, advertising the FA-LSP as a traffic engineering (TE) link to links within the first region; and nesting one or more resource reservation protocol (RSVP) LSPs from the first region into the FA-LSP.

According to a further aspect, a multiprotocol label switching (MPLS) network may include a first region defined by a link having a first color, a second region defined by a link having a second color, and a boundary defined between the first region and the second region based on a change from the first link color to the second link color.

According to still a further aspect, a network may include a first region defined by a network requesting a service, and a second region defined by a network providing the service. The network may also include a boundary defined between the first region and the second region based on the service, and a forwarding adjacency label switched path (FA-LSP) dynamically created in the second region based on the boundary between the first region and the second region.

According to another aspect, a method may include providing a first forwarding adjacency label switched path (FA-LSP) in a multiprotocol label switching (MPLS) network, and providing a second FA-LSP in the MPLS network. The method may also include providing a primary LSP that traverses a path of links that includes links traversed by the first FA-LSP, and providing a secondary LSP that traverses a path of links that excludes the links traversed by the primary LSP based on link coloring.

According to a further aspect, a device may include a memory to store instructions, and a processor to execute the instructions to determine if a link is within a first region or a second region of a multiprotocol label switching (MPLS) network, the first region including a first link color, and the second region including a second link color. The processor may also execute the instructions to define a boundary between the first region and the second region based on the first link color and the second link color. If the link is within the second region, the processor may also execute the instructions to use the boundary between first and second regions to trigger creation of a forwarding adjacency label switched path (FA-LSP) that includes the link and causes the link to appear as a link in the first region.

According to still a further aspect, a system may include means for defining a first region in a multiprotocol label switching (MPLS) network based on a link having a first color, and means for defining a second region in the MPLS network based on a link having a second color. The system may also include means for defining a boundary between the first region and the second region based on the first link color and the second link color, and means for dynamically creating a forwarding adjacency label switched path (FA-LSP) in one of the first region or the second region based on the boundary between the first region and the second region.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Systems and methods consistent with principles of the invention may provide a way of deploying a LSP hierarchy for MPLS networks. This may allow a MPLS network to utilize all of the benefits provided by a LSP hierarchy without the need to upgrade the network devices to support GMPLS.

Exemplary Network Overview

Figure 1:
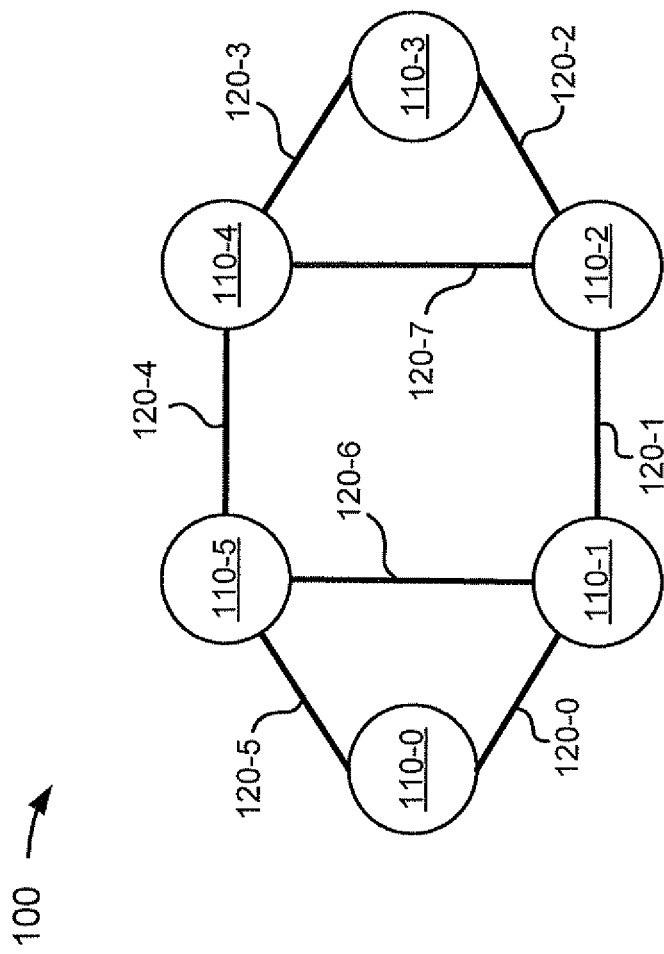
FIG. 1 is a diagram illustrating an exemplary network in which systems and methods consistent with principles of the invention may be implemented.

FIG. 1 is a diagram illustrating an exemplary network 100 in which systems and methods consistent with principles of the invention may be implemented. In one implementation consistent with principles of the invention, network 100 may include, for example, a local area network (LAN)), a private network (e.g., a company intranet), a wide area network (WAN), or another type of network.

As shown in FIG. 1, network 100 may include network devices or nodes 110-0, 110-1, . . . , 110-5 (collectively referred to as network devices 110) interconnected by links 120-0, 120-1, . . . , 120-5 (collectively referred to as links 120). While six network devices 110 and six links 120 are shown in FIG. 1, more or fewer network devices 110 and links 120 may be used in other implementations consistent with principles of the invention. Network 100 may also include other components, devices, etc. (not shown in FIG. 1).

Network device 110 may include any network device, such as a computer, a router (e.g., a label switching router (LSR)), a switch, a network interface card (NIC), a hub, a bridge, etc. Links 120 may include a path that permits communication among devices 110, such as wired, wireless, and/or optical connections.

In an exemplary implementation, network 100 may be a MPLS network, network device 110-0 may be an ingress LSR (or entry point for a datagram), and network device 110-3 may be an egress LSR (or exit point of a datagram) in network 100. Ingress LSR 110-0 may receive a datagram, and may classify the datagram based on a variety of factors into a forwarding equivalent class (FEC). A FEC may include a set of datagrams that may be treated the same for forwarding purposes and may be mapped to a single label. A datagram may be encapsulated in a MPLS shim header that may contain a short, fixed-length locally-assigned label that may be based on the FEC.

Ingress LSR 110-0 may forward a datagram with the MPLS shim header to the next-hop LSR, e.g., to network devices 110-1 or 110-5. Each LSR along a LSP may make a forwarding decision based on the label carried in the MPLS shim header and may not make such a decision based on the destination address carried in a network layer header of the datagram. The datagram forwarding process may be based on the concept of label switching. In this way, a LSP may identify the specific path of network devices 110 and links 120 that a datagram(s) takes through MPLS network 100. The labeled datagram may be forwarded along the LSP by each LSR until it eventually arrives at egress LSR 110-3. The MPLS shim header may be removed from the datagram by either egress LSR 110-3 or by the LSR preceding egress LSR 110-3 (e.g., by network devices 110-2 or 110-4). Egress LSR 110-3 may make a forwarding decision for the datagram based on the destination address carried in the network layer header of the datagram.

To optimize the route or path selection process, the physical path of a LSP may not be restricted to the shortest path that an interior gate protocol (IGP) would select to reach a destination. The physical path for a LSP may be defined using an explicit route. An explicit route may be a preconfigured sequence of LSRs that define the physical path of the LSP. Explicit routes may allow physical paths to be defined that override the shortest path routes established by conventional IP routing (e.g., by IGPs). For example, explicit routes may be used to route traffic around congested points in a network, to optimize resource utilization across a network, and/or to satisfy network and administrative policy constraints.

Exemplary Network Device Configuration

Figure 2:
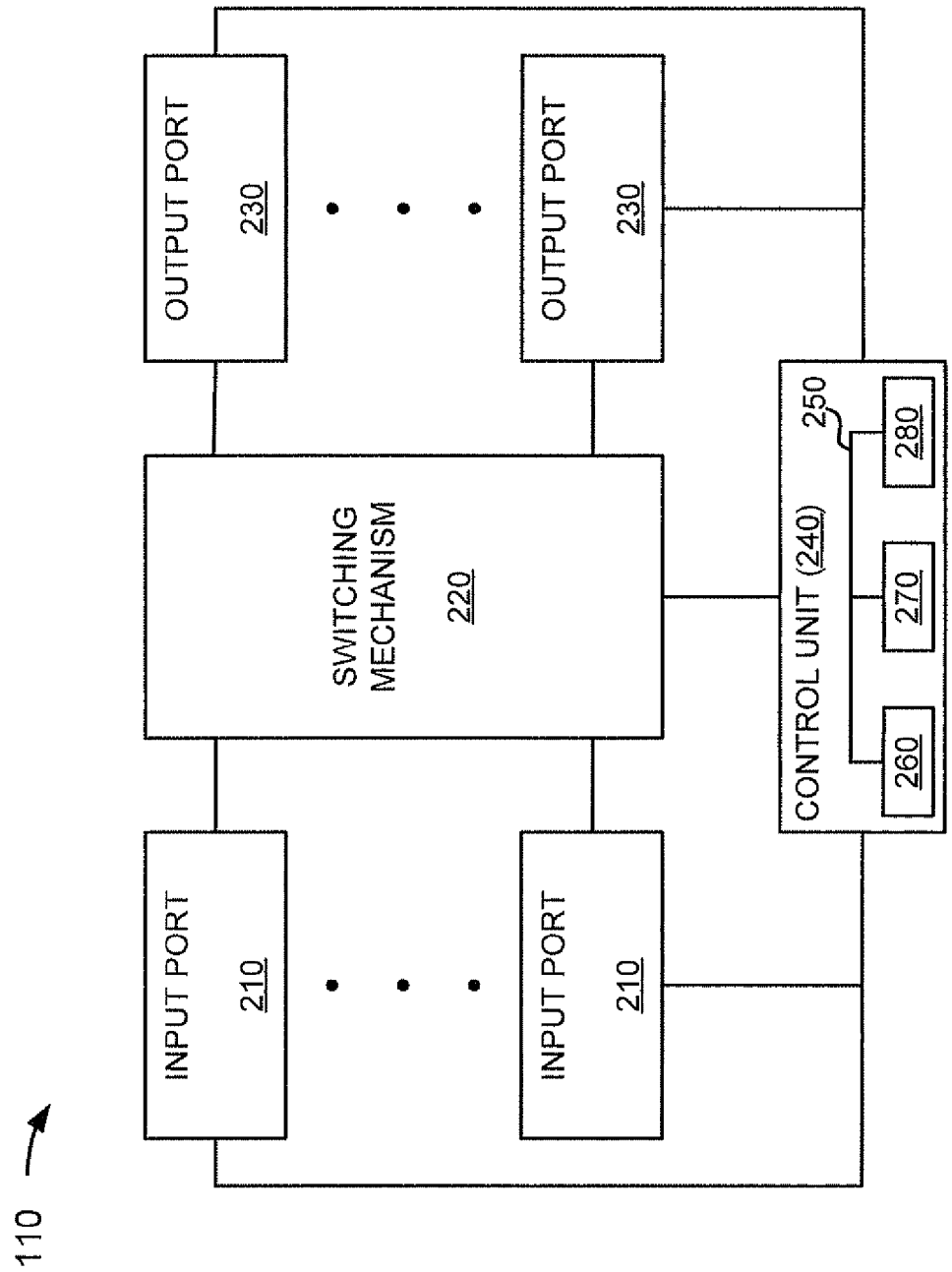
FIG. 2 is an exemplary diagram of a device that may correspond to a node of FIG. 1 according to an implementation consistent with principles of the invention.

FIG. 2 is an exemplary diagram of a device that may correspond to one of network devices 110 of FIG. 1. The device may include input ports 210, a switching mechanism 220, output ports 230, and a control unit 240. Input ports 210 may be the point of attachment for a physical link (e.g., link 120) (not shown) and may be the point of entry for incoming datagrams. Switching mechanism 220 may interconnect input ports 210 with output ports 230. Output ports 230 may store datagrams and may schedule datagrams for service on an output link (e.g., link 120) (not shown). Control unit 240 may participate in routing protocols and may create a forwarding table that is used in datagram forwarding.

Input ports 210 may carry out datalink layer encapsulation and decapsulation. Input ports 210 may look up a destination address of an incoming datagram in a forwarding table to determine its destination port (i.e., route lookup). In order to provide QoS guarantees, input ports 210 may classify datagrams into predefined service classes. Input ports 210 may run datalink-level protocols or network-level protocols.

Switching mechanism 220 may be implemented using many different techniques. For example, switching mechanism 220 may include busses, crossbars, and/or shared memories. The simplest switching mechanism 220 may be a bus that links input ports 210 and output ports 230. A crossbar may provide multiple simultaneous data paths through switching mechanism 220. In a shared-memory switching mechanism 220, incoming datagrams may be stored in a shared memory and pointers to datagrams may be switched.

Output ports 230 may store datagrams before they are transmitted on an output link (e.g., link 120). Output ports 230 may include scheduling algorithms that support priorities and guarantees. Output ports 230 may support datalink layer encapsulation and decapsulation, and/or a variety of higher-level protocols.

Control unit 240 may interconnect with input ports 210, switching mechanism 220, and output ports 230. Control unit 240 may compute a forwarding table, implement routing protocols, and/or run software to configure and manage network device 110. Control unit 240 may handle any datagram whose destination address may not be found in the forwarding table.

In one implementation, control unit 240 may include a bus 250 that may include a path that permits communication among a processor 260, a memory 270, and a communication interface 280. Processor 260 may include a microprocessor or processing logic that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by the processor. Communication interface 280 may include any transceiver-like mechanism that enables control unit 240 to communicate with other devices and/or systems.

Network device 110, consistent with principles of the invention, may perform certain operations, as described in detail below. Network device 110 may perform these operations in response to processor 260 executing software instructions contained in a computer-readable medium, such as memory 270. A computer-readable medium may be defined as a physical or logical memory device and/or carrier wave.

The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Exemplary LSP Hierarchy

Many new applications and new services may create a need for a LSP hierarchy in MPLS networks. For example, new applications such as traffic engineering across multiple domains or areas, and providing call admission control (CAC) of voice and video (e.g., reserving bandwidth for aggregate flow at a voice and/or video gateway) may benefit from a LSP hierarchy. New services such as providing multi-service networks (e.g., one network for voice, one network for video, etc.), and providing QoS for voice traffic may benefit from a LSP hierarchy.

A LSP hierarchy may be needed in MPLS networks for these new applications and services based on a variety of reasons. For example, with the number of services provided on networks expected to grow, networks may need to handle an increase in the scale of traffic engineered (TE) LSPs if a different LSP is set up for each service class. There may be a need to maintain the autonomy of MPLS networks due to the offering of external states (e.g., different administrative domains and address spaces) in the network. There may be a need to shield MPLS networks from the external state that comes with an external service due to the size of the external state, security concerns, and/or the irrelevance of the external state. There may be a need for providing tunnels or paths between provider edge network devices (PEs), i.e., PE to PE TE tunnels, in order to utilize the benefits of RSVP from PEs without incurring the external state provided by PEs.

A LSP hierarchy may permit creation of a forwarding adjacency (FA) in a MPLS network. A FA may be a traffic engineering (TE) link that may be created from a TE LSP in a same control plane instance. A forwarding adjacency LSP (FA-LSP) may be a TE LSP that may be used to create a FA. The FA-LSP may be advertised as any other TE link in a MPLS network. For example, a FA-LSP may include bandwidth, color, and/or any properties that may be assigned to any other physical link in a network. FA-LSP may be advertised into the routing domain in which the FA-LSP was signaled.

Figure 3:
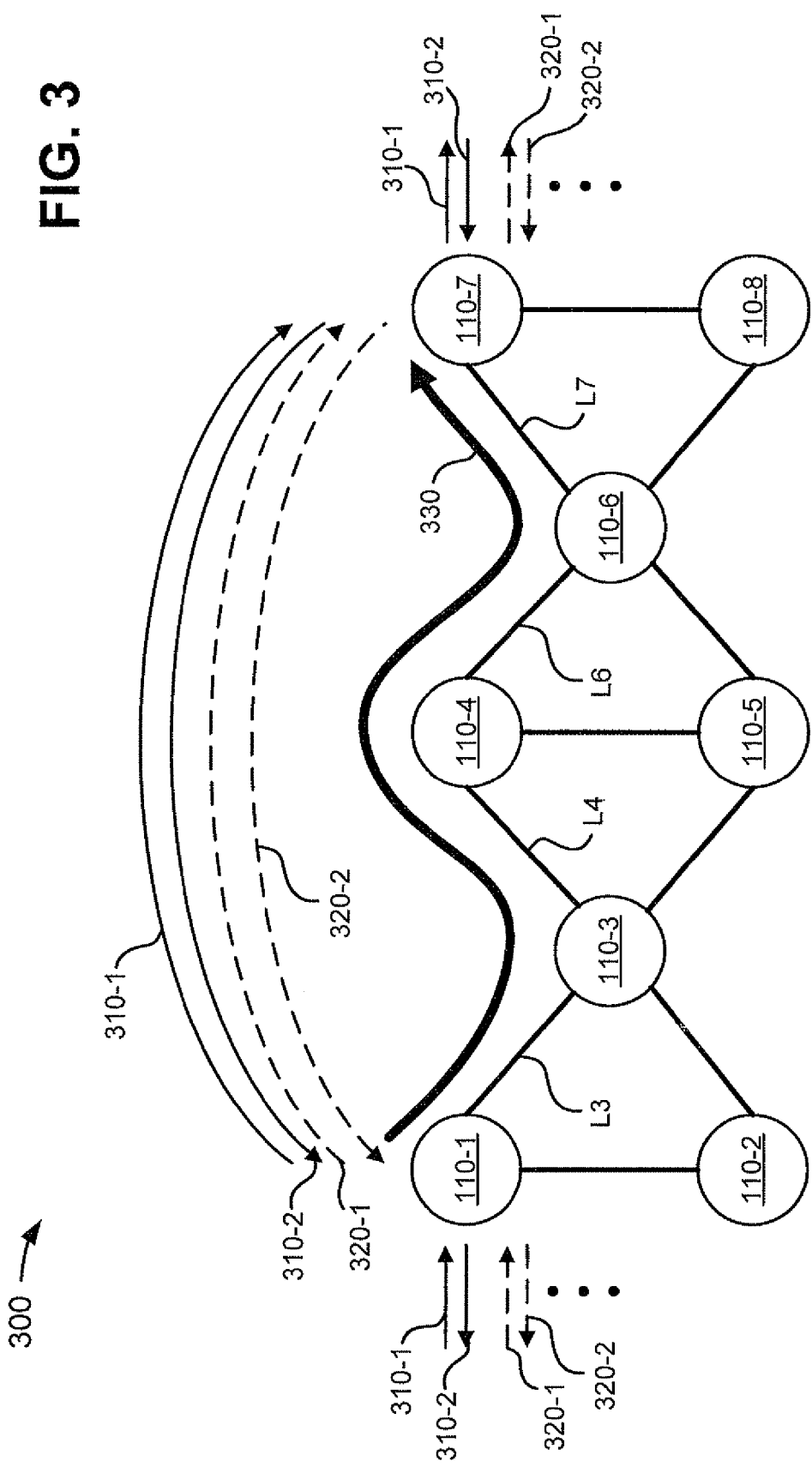
FIG. 3 is a diagram of an exemplary MPLS network that may include a LSP hierarchy according to an implementation consistent with principles of the invention.
Figure 4:
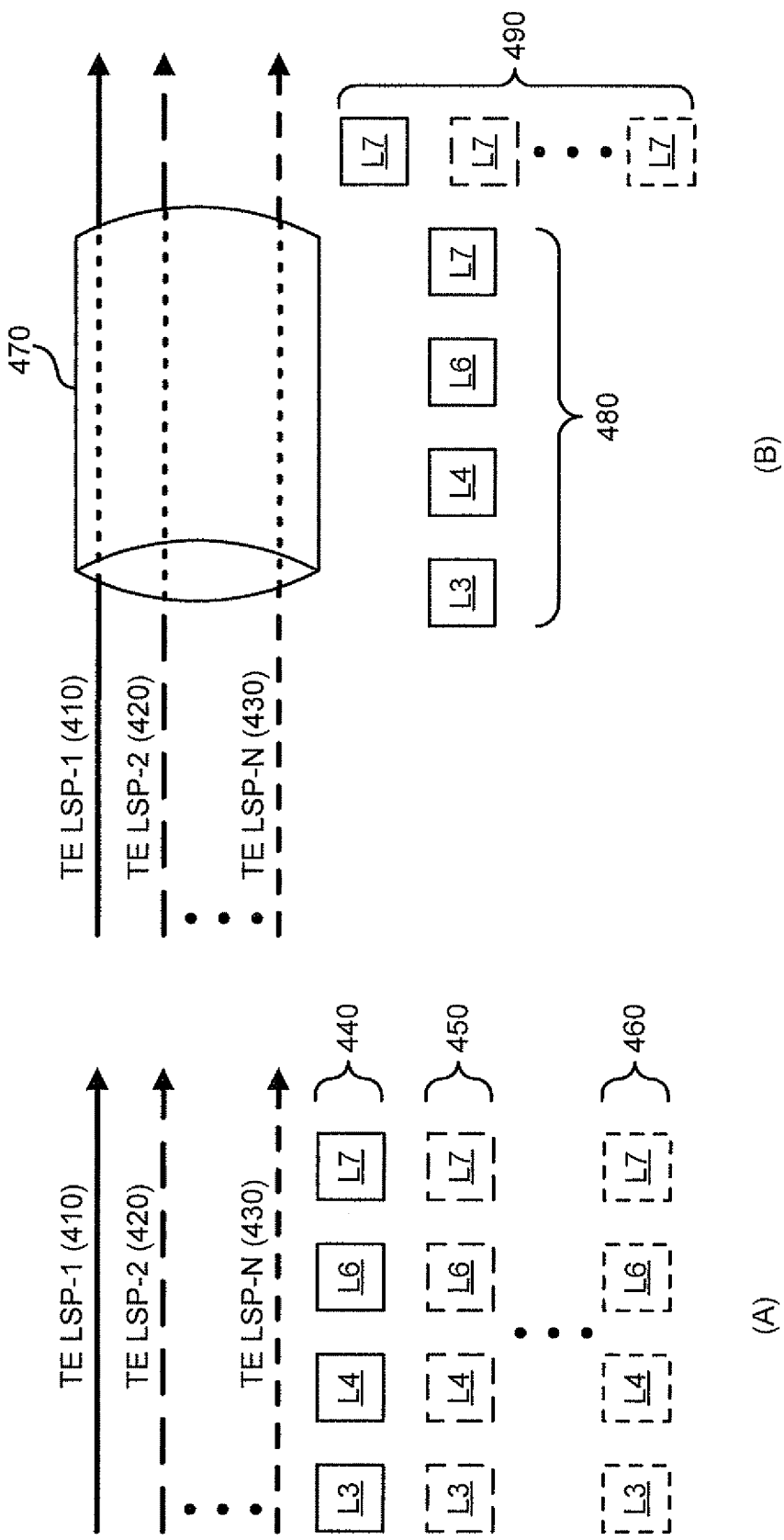
FIG. 4 is an exemplary diagram of a portion of the exemplary MPLS network of FIG. 3 according to an implementation consistent with principles of the invention.

A benefit provided by a LSP hierarchy may include the nesting of one or more RSVP LSPs into another RSVP LSP, i.e., the FA-LSP. This may include nesting of any type of RSVP and/or RSVP-like request (e.g., native RSVP, RSVP-TE, GMPLS RSVP-TE, or any future extensions to RSVP and/or RSVP-like protocol) over an RSVP LSP, where RSVP may be any bandwidth request and/or reservation protocol. This may allow scaling of RSVP LSPs, may reduce the control and forwarding (data) plane states in the network, and/or may restrict the external state at the edge of the MPLS network. FIGS. 3 and 4 provide exemplary diagrams showing the benefits of scaling provided by a LSP hierarchy. FIG. 3 is a diagram of an exemplary MPLS network that may include a LSP hierarchy according to an implementation consistent with principles of the invention. FIG. 4 is an exemplary diagram of a portion of the exemplary MPLS network of FIG. 3 according to an implementation consistent with principles of the invention.

As shown in FIG. 3, a MPLS network 300 may include network devices 110-1, . . . , 110-8 interconnected by links. The links may include link L3 interconnecting network device 110-1 and network device 110-3, link L4 interconnecting network device 110-3 and network device 110-4, link L6 interconnecting network device 110-4 and network device 110-6, and link L7 interconnecting network device 110-6 and network device 110-7.

A number of path messages (e.g., 310-1, 320-1, etc.) and a number of reservation messages (e.g., 310-2, 320-2, etc.) may be provided in network 300. In other words, a number of resource reservation protocol (RSVP) TE LSPs may traverse links L3, L4, L6, and L7 of network 300. RSVP may be a protocol designed to reserve resources across a network. A path message may be sent from a sender host along a path of network 300 and may store a path state in each node (e.g., network device 110) along the path. A reservation message may be sent from a receiver to a sender host along a reverse data path from the path message and may store a reservation state in each node. At each node of network 300, an IP destination address of the reservation message may change to the address of the next node on the reverse path, and the IP source address may change to the address of the previous node address on the reverse path.

A LSP hierarchy may permit nesting of one or more RSVP LSPs (e.g., 310-1, 310-2, 320-1, 320-2, etc.) into another RSVP LSP which may be called a FA-LSP 330. This nesting of RSVP LSPs may improve the scalability of network 300 as it grows in size. Creation of FA-LSP 330 may eliminate the need for any knowledge of path states from path messages (e.g., 310-1, 320-1, etc.) and reservation states from reservation messages (e.g., 310-2, 320-2, etc.) by the nodes inside network 300 along the FA-LSP (e.g., network devices 110-3, 110-4, and 110-6). For example, FA-LSP 330 may tunnel the control plane state directly between network device 110-1 and network device 110-7. The external state may be restricted to the edge of network 300 (i.e., at network devices 110-1 and 110-7), and admission control may be performed at network device 110-1. Network devices 110-3, 110-4, 110-6, and 110-7 may have no knowledge of the control plane states of RSVP LSPs (e.g., 310-1, 310-2, 320-1, 320-2, etc.). This may reduce the control plane state in the middle of network 300, and may prevent dropping of states at network devices, e.g., at network devices 110-3, 110-4, and 110-6.

Additionally, or alternatively, a LSP hierarchy may reduce the data plane state and the number of labels in network 300. As part of setting up a LSP, network devices 110 may set up a label information base (LIB) that may map an incoming label from an input port of network device 110 to an output port of network device 110 and to a new label value. Network devices 110 may forward datagrams along links through MPLS network 300 based on these labels. The labels may be attached to the datagrams to indicate which LSP to use. A label may be swapped to a new label at each network device hop. In this way, a LSP may identify the specific path of nodes (e.g., network devices 110) and links that a datagram may take through MPLS network 300.

As shown at (A) in FIG. 4, multiple TE LSPs may be created, e.g., TE LSP-1 (410), TE LSP-2 (420), . . . , TE LSP-N (430). TE LSPs may correspond to RSVP LSPs shown in FIG. 3, and/or may include additional TE LSPs. Without a LSP hierarchy, the data plane state and labels associated with each TE LSP may be carried over each link traversed by the TE LSP. For example, TE LSP-1 (410) may traverse links 440 of network 300 (e.g., links L3, L4, L6, and L7 of FIG. 3) with the data plane state and labels associated with it. TE LSP-2 (420) may traverse links 450 of network 300 (e.g., links L3, L4, L6, and L7) with the data plane state and labels associated with it. TE LSP-N (430) may traverse links 460 (e.g., links L3, L4, L6, and L7) with the data plane and labels associated with it. Since all of TE LSPs 410-430 traverse the same links of network 300, the data planes and labels associated with TE LSPs 410-430 may create congestion and state dropping in network 300.

As shown at (B) in FIG. 4, with a LSP hierarchy, TE LSPs (e.g., TE LSP-1 (410), TE LSP-2 (420), . . . , TE LSP-N (430)) may be nested into a single TE LSP tunnel or FA-LSP 470. FA-LSP 470 may be created dynamically, i.e., when needed or demanded by network 300. Nesting of TE LSPs 410-430 in FA-LSP 470 may reduce the data plane state and the number of labels in network 300. The data plane state may remain at the edge of network 300, e.g., at network device 110-1 (as shown in FIG. 3). For example, links L3, L4, L6, and L7 may not need to carry the data plane state or labels of TE LSPs 410-430 once FA-LSP 470 is established. This may reduce the data plane state and the number of labels in MPLS network 300, which may be beneficial due to the limited space available for labels. Once the nested TE LSPs 410-430 travel through FA-LSP 470, the data plane state and labels may reemerge (490) at the edge of network 300 (e.g., at the end of link L7 of FIG. 3).

Exemplary System Operation

Figure 5:
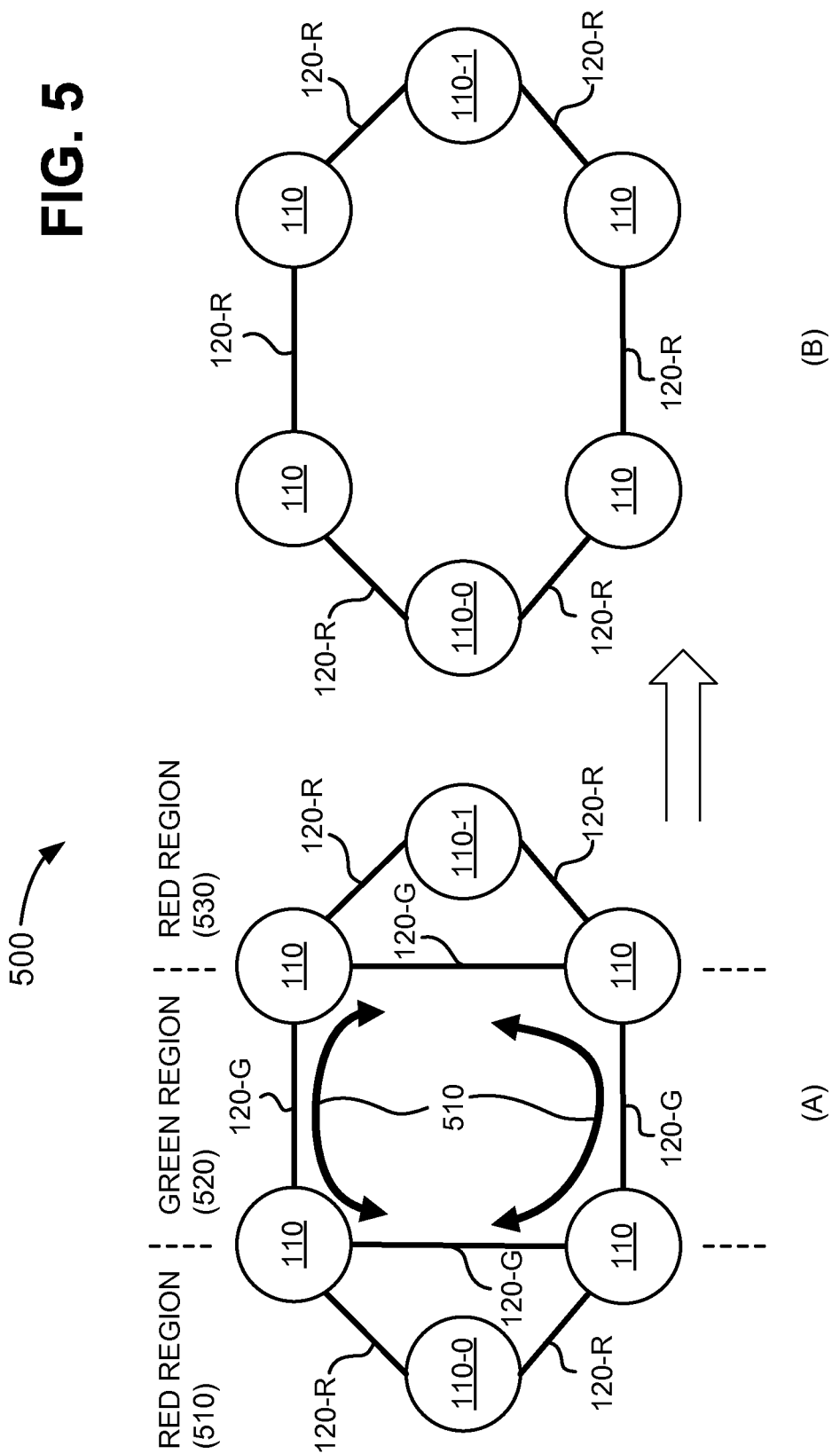
FIG. 5 is a diagram of an exemplary MPLS network that may include a LSP hierarchy and regions based on link coloring according to an implementation consistent with principles of the invention.
Figure 6:
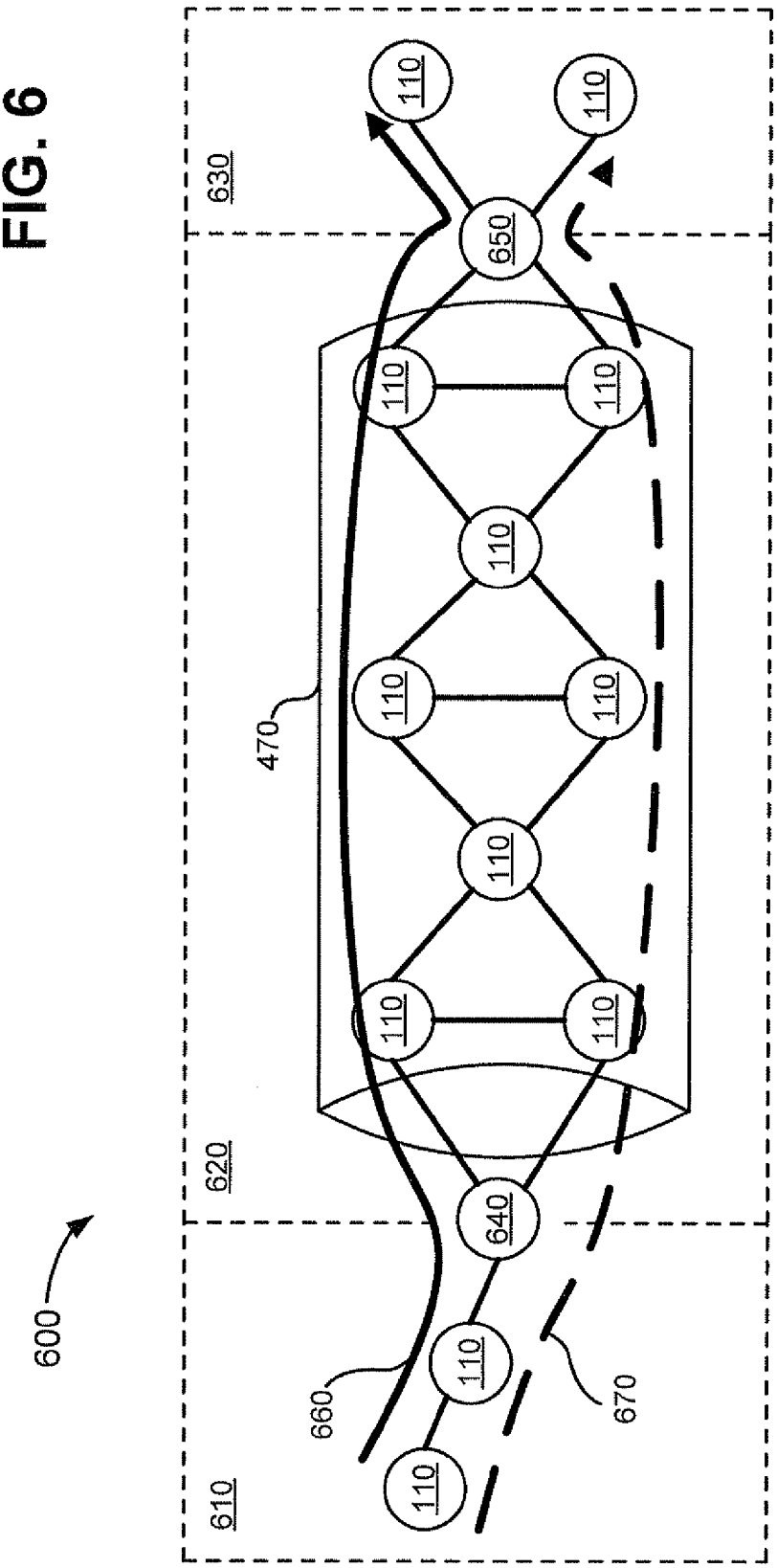
FIG. 6 is a diagram of an exemplary network that may include a MPLS network that may have a LSP hierarchy and routing domain based regions according to an implementation consistent with principles of the invention.
Figure 7:
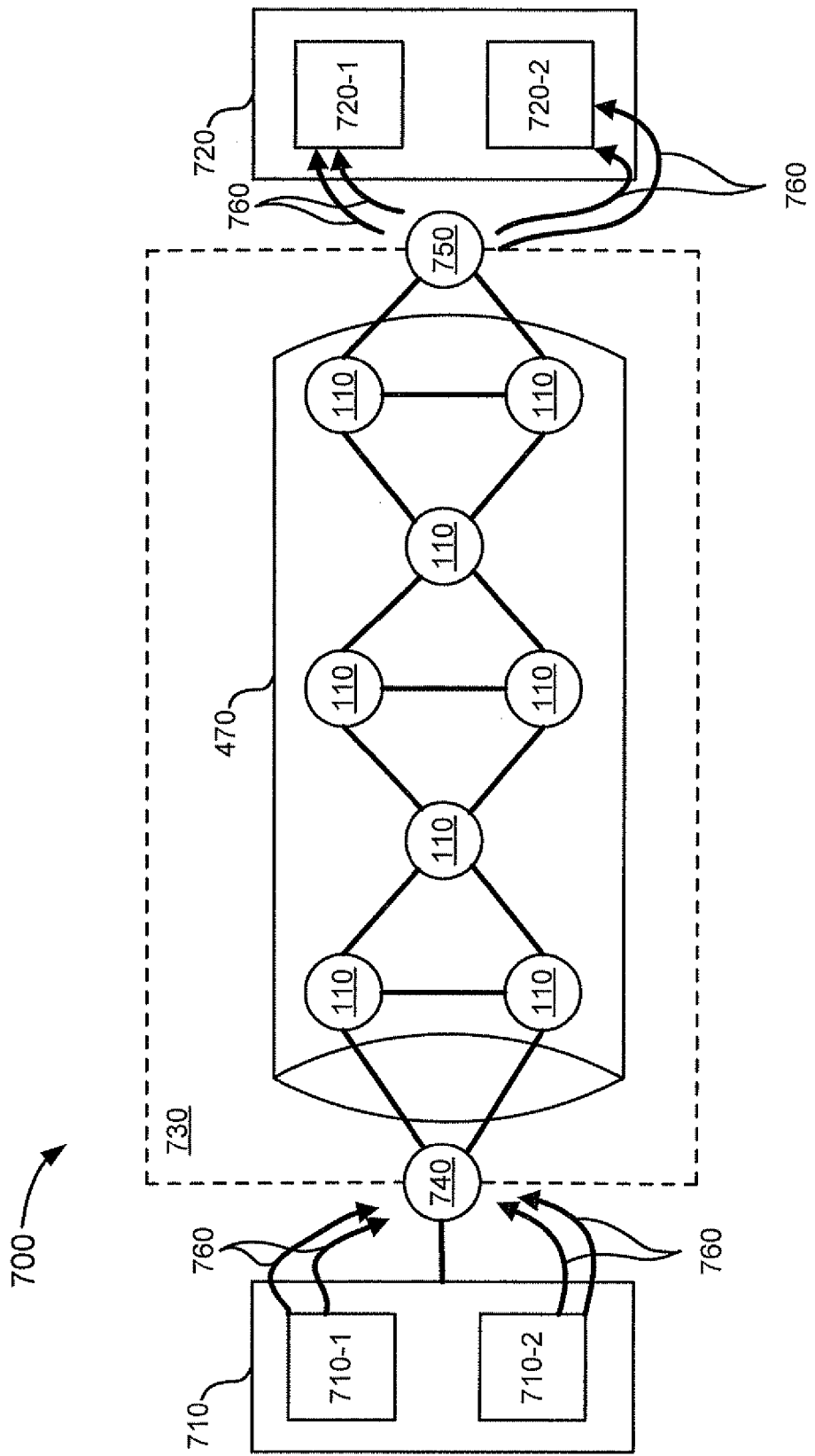
FIG. 7 is a diagram of an exemplary network that may include a MPLS network that may have a LSP hierarchy and service based regions according to an implementation consistent with principles of the invention.

Creation of a LSP hierarchy for a MPLS network may be triggered based on flexible, generalized regions that may be defined in the MPLS network. FIGS. 5-7 are diagrams of exemplary networks that may use flexible, generalized regions to trigger a LSP hierarchy in a MPLS network according to an implementation consistent with principles of the invention. Generalized regions may enable a LSP hierarchy to be implemented in a MPLS network without the need for the rigid, incompatible signaling and routing extensions necessary in a GMPLS network, and without the need to upgrade a network to support GMPLS.

Link Coloring Based Regions

FIG. 5 is a diagram of an exemplary MPLS network that may use link coloring based regions to trigger a LSP hierarchy according to an implementation consistent with principles of the invention. As shown at (A) of FIG. 5, a MPLS network 500 may include multiple network devices 110 interconnected by links 120. Network devices 110-0 and 110-1 may be, for example, edge devices such as edge routers.

As part of traffic engineering, a color (which may be referred to as resource class affinity and/or administrative group) may be assigned to links to achieve some desired LSP placement. For example, if a network administrator wants to prevent a regional LSP from traversing network devices or links outside the region, color may be used to achieve the goal.

According to an implementation consistent with principles of the invention, link coloring may be used to define regions within a network and may be used to create a boundary that may trigger a LSP hierarchy in the network. For example, as shown at (A) of FIG. 5, the links connecting edge network devices 110-0 and 110-1 to network devices 110 may be colored red (e.g., links 120-R), and the links interconnecting network devices 110 may be colored green (e.g., links 120-G). Such an arrangement may create two regions within network 500, e.g., red regions 510 (defined by red links 120-R) and a green region 520 (defined by green links 120-G).

The boundary between two regions of network 500 (e.g., between red region 510 and green region 520) may be used to trigger creation of a FA-LSP 530 in one of the regions (e.g., in green region 520). FA-LSP 530 may include one bi-directional FA-LSP or two uni-directional FA-LSPs, and may be dynamically created, i.e., as needed or demanded by network 500. Creation of FA-LSP 530 may cause network 500 to appear as shown at (B) in FIG. 5. FA-LSP 530 may cause green links 120-G to appear as red links 120-R to edge network devices 110-0 and 110-1, enabling scalability, reducing the number of labels, reducing the control plane state, and reducing the data plane state in network 500. FA-LSP 530 may appear and be treated as any TE link in network 500.

Routing Domain Based Regions

FIG. 6 is a diagram of an exemplary network that may use routing domain based regions to trigger a LSP hierarchy. As shown in FIG. 6, a network 600 may include a first routing domain 610, a second routing domain 620, and a third routing domain 630. First routing domain 610 may include interconnected network devices 110 and may interconnect with second routing domain 620 via an edge network device 640. Second routing domain 620 may be a MPLS network. Second routing domain 620 may include interconnected network devices 110, and may interconnect with third routing domain 630 via an edge network device 650.

Routing domains 610-630 may define regions within network 600. The location where routing domains 610-630 meet (e.g., at edge network devices 640 and 650) may be used to create a boundary that may trigger a LSP hierarchy in network 600. For example, as shown in FIG. 6, the routing domain boundaries may be used to create FA-LSP 470 (as discussed previously in connection with FIG. 4) in second routing domain 620. FA-LSP 470 may be dynamically created, i.e., as needed by network 600. Creation of FA-LSP 470 may cause second routing domain 620 to appear as one TE link to RSVP LSPs 660 and 670 emanating from first routing domain 610 and terminating in third routing domain 630. FA-LSP 470 may enable scalability, reduce the number of labels, reduce the control plane state, and reduce the data plane state in network 600. FA-LSP 470 may appear and be treated as any TE link in network 600, and may enable inter-domain traffic engineering.

Service Based Regions

FIG. 7 is a diagram of an exemplary network that may use service based regions to trigger a LSP hierarchy. As shown in FIG. 7, a network 700 may include a first service based region (e.g., first customer gateway 710) and a second service based region (e.g., second customer gateway 720) interconnected by a network 730 (e.g., a MPLS network), which may define another region in network 700. First customer gateway 710 may include gateways 710-1 and 710-2. Although FIG. 7 shows two gateways 710-1 and 710-2, more or fewer gateways may be included in first customer gateway 710. First customer gateway 710 may interconnect with network 730 via an edge network device 740.

Second customer gateway 720 may include gateways 720-1 and 720-2. Although FIG. 7 shows two gateways 720-1 and 720-2, more or fewer gateways may be included in second customer gateway 720. Second customer gateway 720 may interconnect with network 730 via an edge network device 750. Network 730 may include interconnected network devices 110.

First customer gateway 710, second customer gateway 720, and network 730 may define regions within network 700. Where the regions meet (e.g., at edge network devices 740 and 750) may be used to create a boundary that may trigger a LSP hierarchy in network 700. For example, as shown in FIG. 7, the region boundaries may be used to create FA-LSP 470 (as discussed previously in connection with FIG. 4) in MPLS network 730. FA-LSP 470 may be dynamically created, i.e., as needed or demanded by network 700. Creation of FA-LSP 470 may cause MPLS network 730 to appear as one TE link to RSVP LSPs 760 emanating from first customer gateway 710 and terminating in second customer gateway 720. FA-LSP 470 may enable scalability, reduce the number of labels, reduce the control plane state, and reduce the data plane state in network 700. FA-LSP 470 may appear and be treated as any TE link in network 700.

Although FIG. 7 shows two service based networks (e.g., customer gateways 710 and 720) to define regions, other service based networks may be used according to an implementation consistent with principles of the invention. For example, any service based network (e.g., a network in which real-time traffic may travel on sets of services) may be used to define a region.

Deploying a LSP hierarchy in a MPLS network, such as the MPLS networks shown in FIGS. 5-7, may involve advertising the FA-LSP as a TE link. FA advertisements may include an interface switching capability descriptor (e.g., switching type, encoding type, etc.). However, FA advertisements may not be compatible with MPLS TE advertisements. In an implementation consistent with principles of the invention, FA-LSPs in a MPLS network may be advertised without GMPLS extensions, e.g., like other MPLS TE links. For example, FA-LSP advertisements in a MPLS network may be interior gate protocol (IGP) advertisements without GMPLS extensions.

Although FIGS. 5-7 show creation of FA-LSPs using three regions (e.g., based on link colors, routing domains, and/or services), more or fewer than three regions may be used depending on how many levels of hierarchy are desired. For example, multiple link colors may be used to create more levels of hierarchy than shown in FIG. 5.

EXAMPLES

Figure 8:
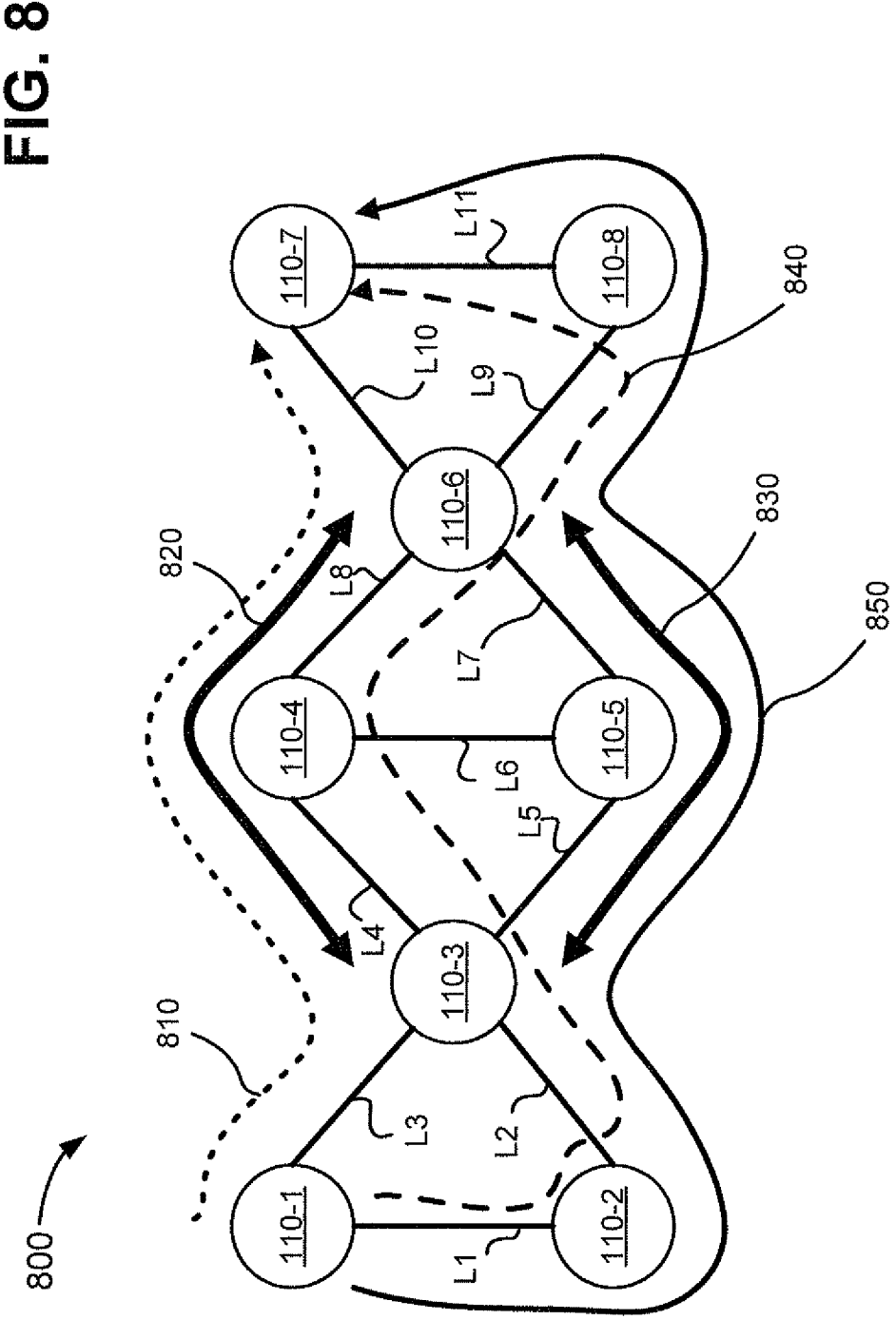
FIGS. 8 and 9 are diagrams of exemplary MPLS networks that may include LSP hierarchies and diverse path calculations according to implementations consistent with principles of the invention.
Figure 9:
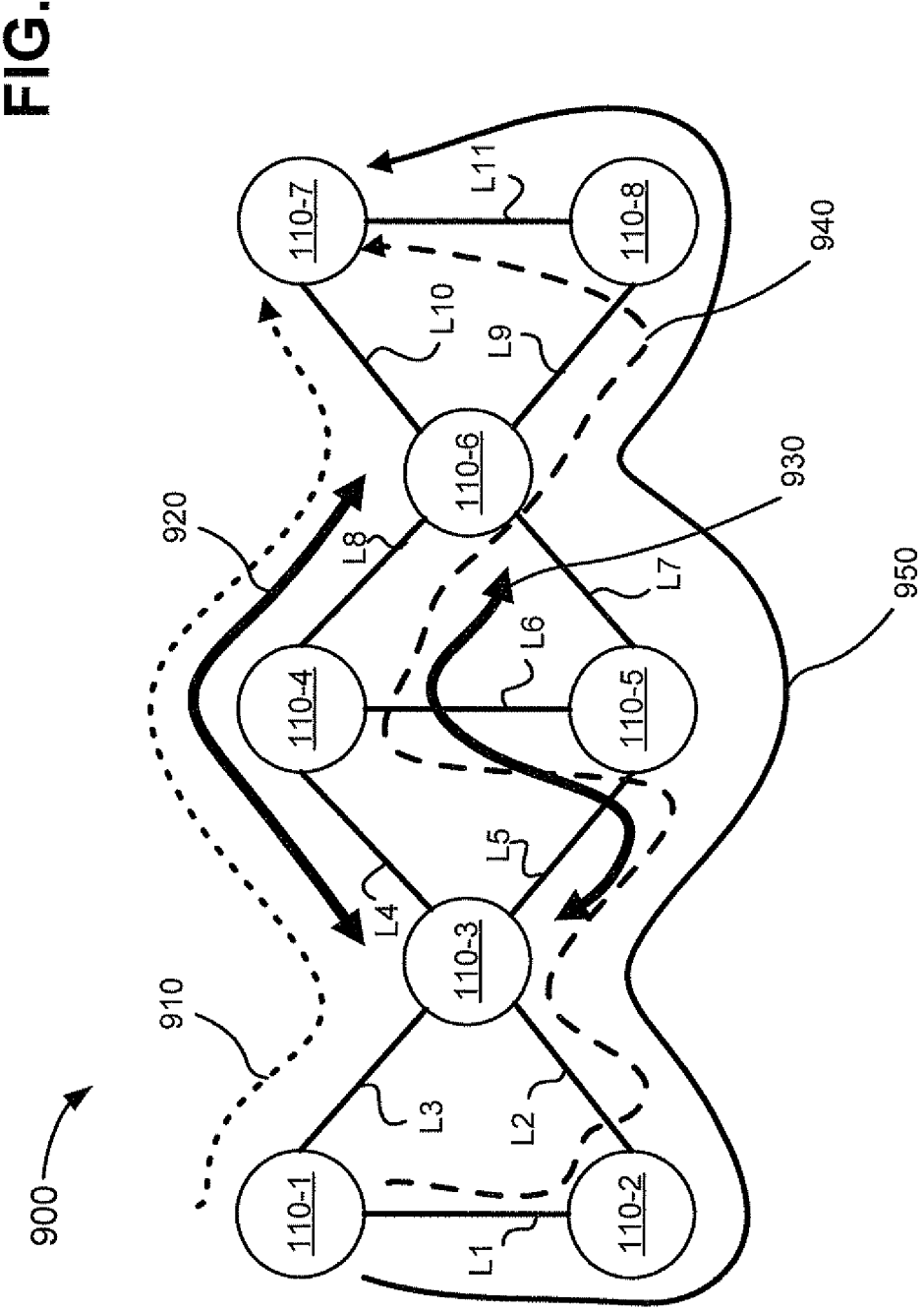

FIGS. 8 and 9 are diagrams of exemplary MPLS networks that may include LSP hierarchies and diverse path calculations according to implementations consistent with principles of the invention.

Diverse Path Calculation Example 1

As shown in FIG. 8, a MPLS network 800 may include network devices 110-1, . . . , 110-8 interconnected by links L1, L3, . . . , L11. Network 800 may include a primary LSP 810, and two FA-LSPs 820 and 830. Primary LSP 810 may, for example, traverse links L3, L4, L8, and L10. FA-LSPs 820 and 830 may advertise links L4-L8 as one TE link, and a LSP may only see FA-LSPs 820 and 830 as a TE link between network devices 110-3 and 110-6.

In this arrangement, it may be desired that a secondary LSP be created that may travel a path diverse from the path taken by primary LSP 810. However, due to FA-LSP 820, a secondary LSP 840 may traverse a path that may have links (e.g., links L4 and L8) that may be common to links traversed by primary LSP 810. In order to create a secondary LSP diverse from primary LSP 810, an administrative group policy may be implemented that may exclude links L4 and L6 from the calculation of the path for the secondary LSP. For example, FAs and physical links (e.g., links L4 and L6) may be colored differently, and the color of links L4 and L6 may be excluded from the calculation of the path for a secondary LSP 850. Secondary LSP 850 may traverse a path (e.g., links L1, L2, L5, L7, L9, and L11) that may be diverse from the path taken by primary LSP 810.

Diverse Path Calculation Example 2

As shown in FIG. 9, a MPLS network 900 may include network devices 110-1, . . . , 110-8 interconnected by links L1, L3, . . . , L11. Network 900 may include a primary LSP 910, and two FA-LSPs 920 and 930. Primary LSP 910 may, for example, traverse links L3, L4, L8, and L10. FA-LSPs 920 and 930 may advertise links L4-L8 as one TE link, and a LSP may only see FA-LSPs 920 and 930 as a TE link between network devices 110-3 and 110-6.

In this arrangement, it may be desired that a secondary LSP be created that may travel a path diverse from the path taken by primary LSP 910. However, due to FA-LSP 930, a secondary LSP 940 may traverse a path that may have a common link (e.g., link L8) with primary LSP 910. In order to create a secondary LSP diverse from primary LSP 910, the concepts of fate sharing and Shared Risk Link Groups (SRLGs) may be implemented to exclude links L4 and L6 from the calculation of the path for a secondary LSP 950. The MPLS traffic engineering SRLG feature may enhance backup path selection so that a backup path may avoid using links that are in the same SRLG as interfaces the backup path is protecting. Secondary LSP 950 may traverse a path (e.g., links L1, L2, L5, L7, L9, and L11) that may be diverse from the path taken by primary LSP 910.

Exemplary Processing

Figure 10:
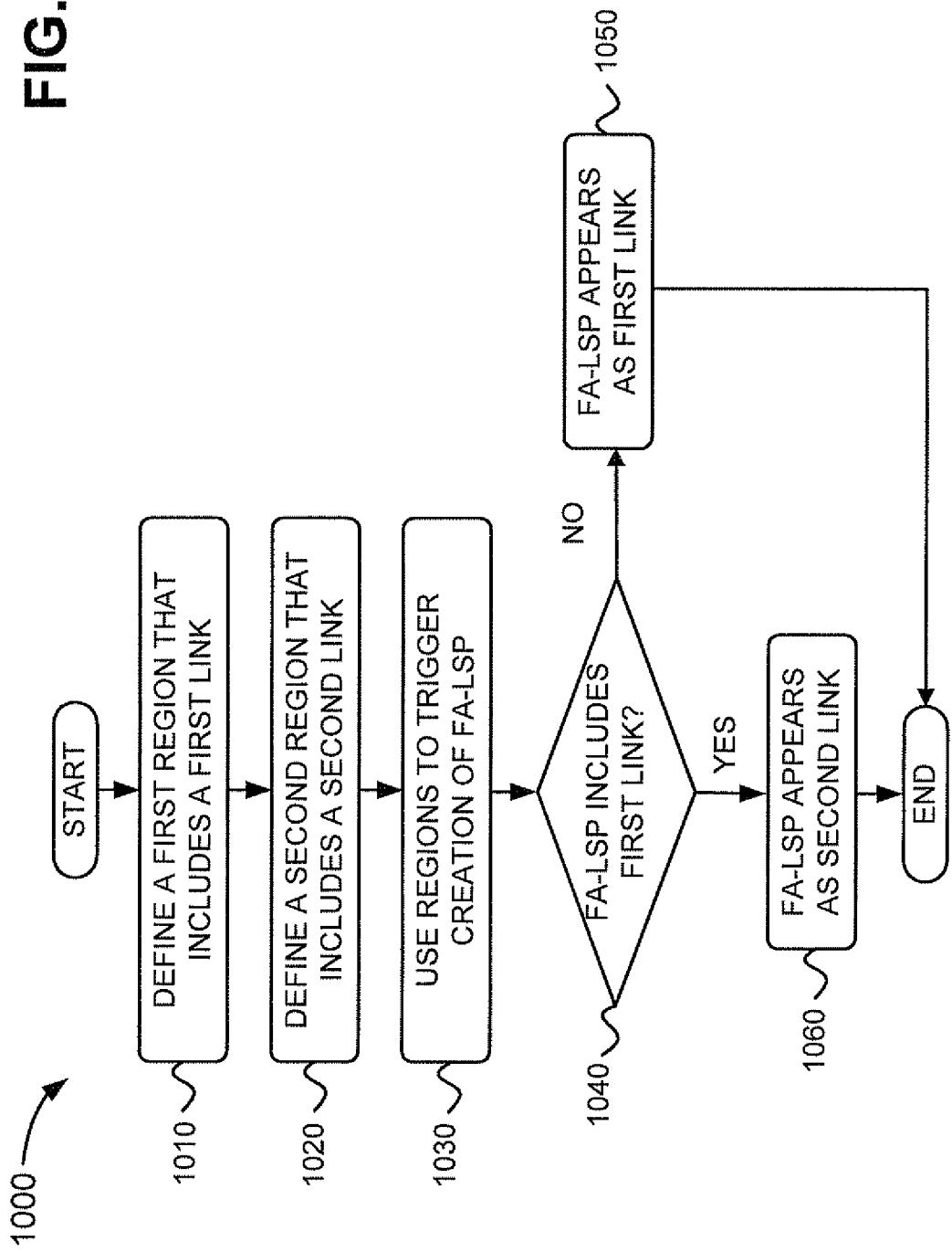
FIGS. 10-12 are flowcharts of exemplary processing for a network and/or a network device of FIG. 1 according to an implementation consistent with principles of the invention.
Figure 11:
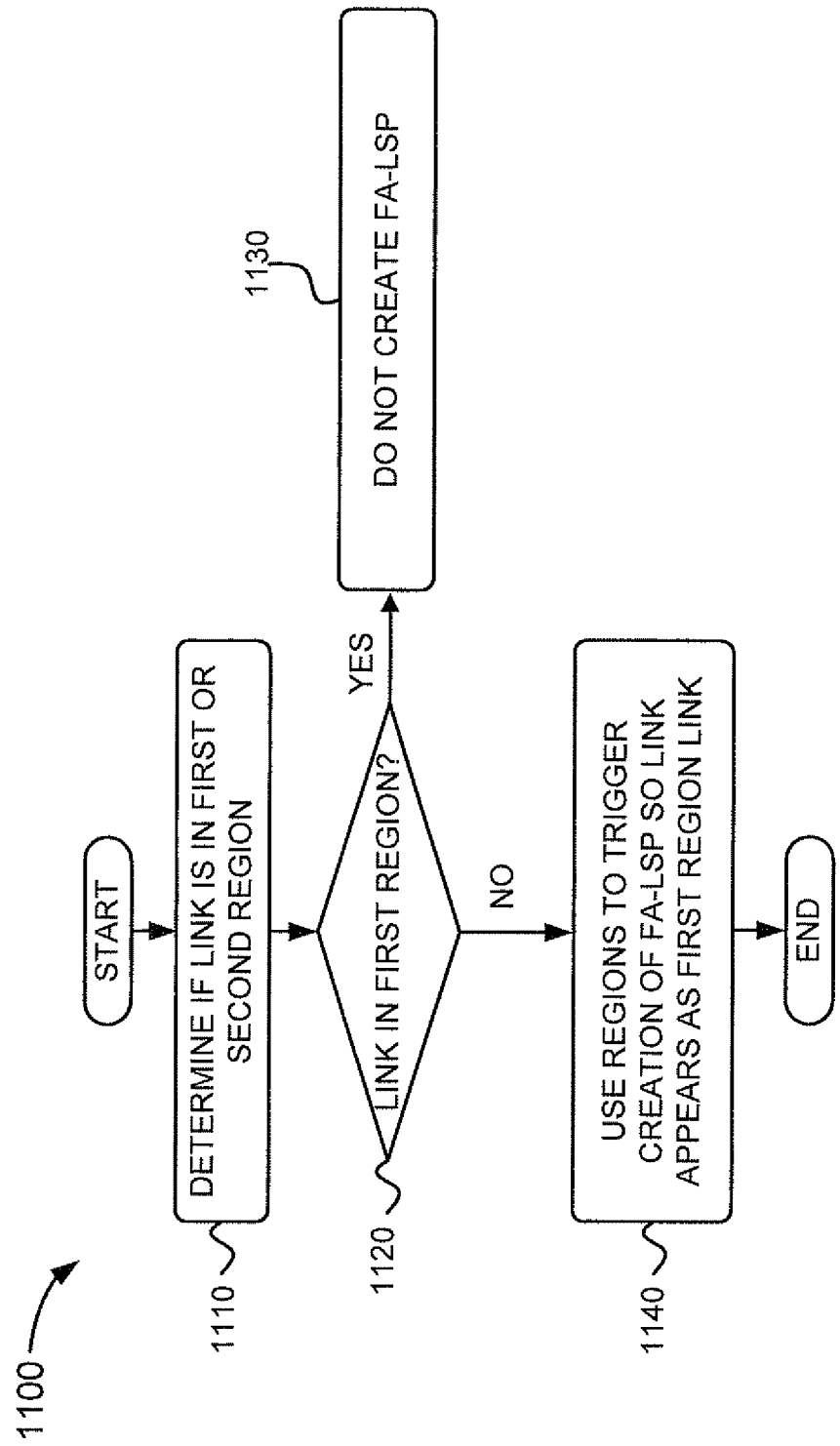
Figure 12:
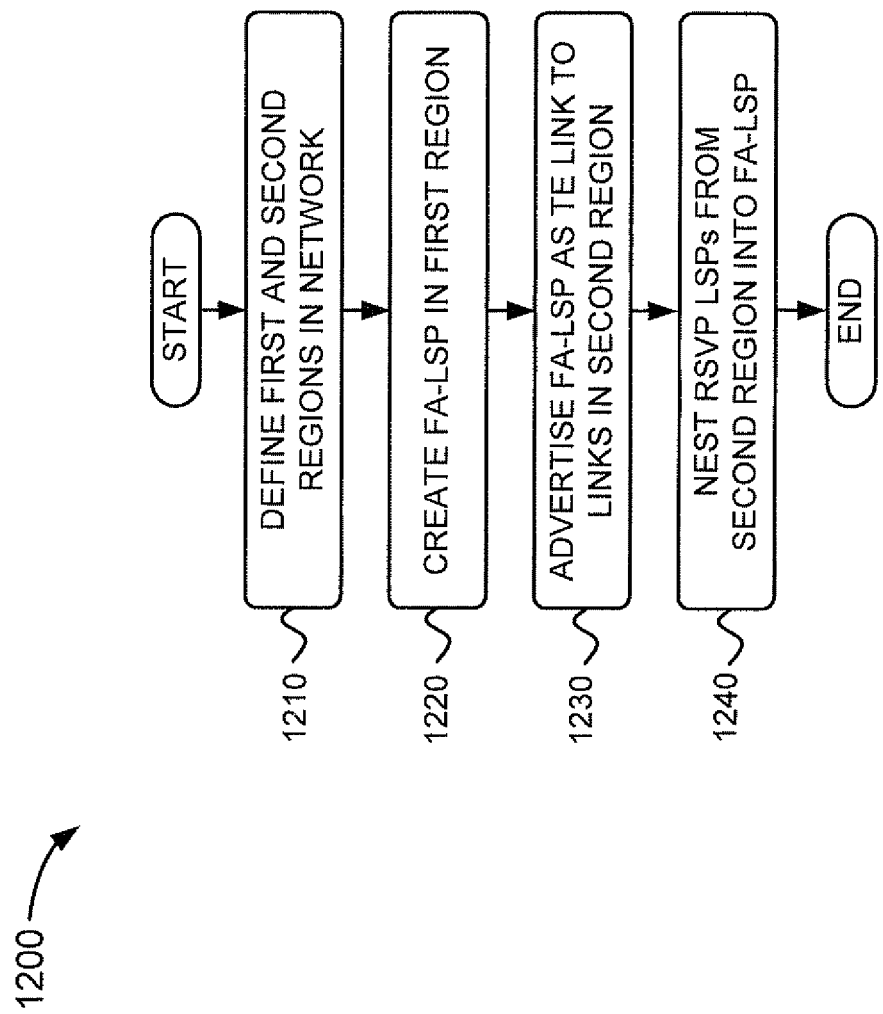

FIGS. 10-12 are flowcharts of exemplary processing for a network and/or a network device of FIG. 1 according to an implementation consistent with principles of the invention. The processing of FIGS. 10-12 may be performed by a device of a network or may be performed by a device external to the network but communicating with the network. The processing may be located within network device 110 of FIG. 1 (e.g., within control unit 240) and/or be accessible by network device 110 of FIG. 1.

In one implementation, as shown in FIG. 10, processing 1000 may begin by defining a first region that includes a first link between devices of a network (block 1010). For example, as shown in FIG. 5, red links 120-R may define a first region or red region 510 in network 500. A second region may be defined and may include a second link between devices of the network (block 1020). For example, as shown in FIG. 5, green links 120-G may define a second region or green region 520 in network 500. The first and second regions may be used to define a boundary that may trigger creation of a FA-LSP that may include one of the first or second links (block 1030). For example, the boundary between the two regions (e.g., between red region 510 and green region 520) of FIG. 5 may be used to trigger creation of FA-LSP 530 which may include at least one link 120-G of green region 520 of network 500.

If the FA-LSP does not include the first link (block 1040—NO), then the FA-LSP may include the second link and may appear as the first link (block 1050). For example, as described in connection with FIG. 5, FA-LSP 530 may cause green links 120-G (e.g., second links) to appear as red links 120-R (e.g., first links). FA-LSP 530 may appear and be treated as any TE link in network 500. If the FA-LSP includes the first link (block 1040—YES), then the FA-LSP may appear as the second link (block 1060). For example, if green region 520 of FIG. 5 was the first region and red region 510 was the second region, then FA-LSP 510 may cause green links 120-G (e.g., first links) to appear as red links 120-R (e.g., second links).

In another implementation, as shown in FIG. 11, processing 1100 may include determining if a link is in a first or second region of a network (block 1110). For example, a link may be in first routing domain 610 (e.g., a first region) or in MPLS-based second routing domain 620 (e.g., a second region) of network 600 of FIG. 6. If the link is within the first region (block 1120—YES), then a FA-LSP may not be created in the region (block 1130). For example, if the link is contained in first routing domain 610 of FIG. 6 and first routing domain 610 is not MPLS based, then a FA-LSP may not be able to be created in first routing domain 610.

If the link is not within the first region (i.e., it is in the second region) (block 1120—NO), then the first and second regions may be used to define a boundary that may trigger creation of a FA-LSP in the second region so that the link appears as a link in the first region (block 1140). For example, as shown in FIG. 6, if the link is within MPLS based second routing domain 620 (e.g., the second region), then FA-LSP 470 may be created in second routing domain 620. All of the links within FA-LSP 470 may appear as a TE link to the links within first routing domain 610.

In still another implementation, as shown in FIG. 12, processing 1200 may include defining first and second regions within a network (block 1210). For example, as shown in FIG. 7, MPLS network 730 may define a first region and first customer gateway 710 may define a second region within network 700. The first and second regions may be used to define a boundary that may trigger creation of a FA-LSP in the first region of the network (block 1220). For example, as shown in FIG. 7, FA-LSP 470 may be created in MPLS network 730 (e.g., a first region). The FA-LSP may be advertised as a TE link to the links in the second region (block 1230). For example, FA-LSP 470 may be advertised as a TE link to the links of first customer gateway 710 (e.g., a second region), as shown in FIG. 7. One or more RSVP LSPs from the second region may be nested into the FA-LSP (block 1240). For example, as shown in FIG. 7, RSVP LSPs 760 emanating from first customer gateway 710 may be nested into FA LSP 470.

CONCLUSION

Systems and methods consistent with principles of the invention may provide a way of deploying a LSP hierarchy for MPLS networks. This may allow a MPLS network to utilize all of the benefits provided by a LSP hierarchy (e.g., scalability, reduction in the number of labels, and reduction in the control plane and data plane states) without the need to upgrade the network devices to support GMPLS.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, systems and methods consistent with principles of the invention may apply to single stream as well as multi-stream environments. In another implementation, systems and methods consistent with principles of the invention may apply to point to point (P2P) LSPs as well as point to multipoint (P2MP) LSPs.

Also, while series of acts have been described with regard to the flowcharts of FIGS. 10-12, the order of the acts may differ in other implementations consistent with principles of the invention. Further, non-dependent acts may be performed in parallel.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method comprising:
defining, by one or more network devices, a first region in a network,
the first region comprising a first link of the network, and
the first region being a multiprotocol label switching (MPLS) based region;

defining, by the one or more network devices, a second region in the network, the second region comprising a second link of the network;
determining, by the one or more network devices, that the first link is in the MPLS based region;
defining, by the one or more network devices, a boundary between the first region and the second region based on the first region and the second region after determining that the first link is in the MPLS based region; and
creating, by the one or more network devices and after determining that the first link is in the MPLS based region, a label switched path (LSP) hierarchy,
the creating of the LSP hierarchy includes:
using, by the one or more network devices, the boundary to create a forwarding adjacency label switched path (FA-LSP) that includes the first link and one or more other links of the first region,
the FA-LSP causing the first link and the one or more other links to appear to be in the second region of the network.

2. The method of claim 1, where the FA-LSP is dynamically created based on the boundary.

3. The method of claim 1, where the first link is a traffic engineering (TE) link.

4. The method of claim 1, further comprising:
nesting one or more resource reservation protocol (RSVP) LSPs into the FA-LSP.

5. A method, performed by one or more network devices in at least one multiprotocol label switching (MPLS) network, comprising:
determining, by the one or more network devices, whether a link is in a first region of the at least one MPLS network or a second region of the at least one MPLS network,
the first region being associated with a first link color,
the second region being associated with a second link color, and
the second link color being different from the first link color;
defining, by the one or more network devices, a boundary between the first region and the second region based on the first link color and the second link color; and
creating, by the one or more network devices, a label switched path (LSP) hierarchy, in the at least one MPLS network, based on the defined boundary,
when the link is in the second region, creating the LSP hierarchy further comprises:
creating, by the one or more network devices, a forwarding adjacency label switched path (FA-LSP) that includes the link and that makes the link appear to be in the first region, and
when the link is in the first region, creating the LSP hierarchy further comprises:
creating, by the one or more network devices, a FA-LSP that includes the link and that makes the link appear to be in the second region.

6. The method of claim 5, where the FA-LSP is dynamically created.

7. A method comprising:
determining, by one or more network devices, that a link is in a first region, of at least one network, that is a multiprotocol label switching (MPLS) based region;
defining, by the one or more network devices, a boundary between the first region and a second region, of the at least one network, after determining that the link is in the first region;
creating, by the one or more network devices and after determining that the link is in the first region, a label switched path (LSP) hierarchy by creating a forwarding adjacency label switched path (FA-LSP) in the first region based on the boundary; and
send an FA-LSP advertisement identifying the FA-LSP as a traffic engineering (TE) link to links in the second region,
the FA-LSP causing the TE link to appear to be in the second region.

8. The method of claim 7, where the FA-LSP advertisement is an interior gate protocol (IGP) advertisement without generalized multiprotocol label switching (GMPLS) extensions.

9. A system comprising:
one or more network devices to:
define a first region that includes a first link of a network,
the first region being a multiprotocol label switching (MPLS) based region;
define a second region that includes a second link of the network;
determine that the first link is in the MPLS based region;
define a boundary between the first region and the second region; and
create a label switched path (LSP) hierarchy based on the boundary,
when creating the LSP hierarchy after determining that the first link is in the MPLS based region, the one or more processors are to:
create, based on the boundary, a forwarding adjacency label switched path (FA-LSP) in the first region,
the FA-LSP including the first link and one or more other links of the first region, and
the FA-LSP causing the first link and the one or more other links to appear to be in the second region.

10. The system of claim 9, where the first link is a traffic engineering (TE) link.

11. The system of claim 9, where the one or more network devices are further to:
nest one or more resource reservation protocol (RSVP) LSPs into the FA-LSP.

12. A system comprising:
one or more devices to:
define a first region of a network,
the first region being a multiprotocol label switching (MPLS) based region;
define a second region of the network;
determine that a link is in the MPLS based region;
define a boundary between the first region and the second region after determining that the first link is in the MPLS based region; and
create, based on the boundary, a label switched path (LSP) hierarchy,
when creating the LSP hierarchy, the one or more devices are to:
create, based on the boundary, a forwarding adjacency label switched path (FA-LSP) in the first region after determining that the first link is in the MPLS based region,
the FA-LSP causing the first link and one or more other links, of the first region, to appear to be in the second region of the network.

13. The system of claim 12, where the first region and the second region are routing domain based regions.

14. A device comprising:
a memory; and
a processor to:
   determine whether a link is in a first region or a second region of a network,
      the second region being a multiprotocol label switching (MPLS) based region;
   define a boundary between the first region and the second region; and
   create a label switched path (LSP) hierarchy based on the boundary,
      when creating the LSP hierarchy and the link is in the second region, the processor is to:
         create, based on the boundary, a forwarding adjacency label switched path (FA-LSP) that includes the link and causes the link to appear to be in the first region.

15. The device of claim 14, where, when the link is in the first region, the processor is further to:
   determine that the link is not in the MPLS based region, and
   create the FA-LSP in the second region or in a third region that is different from the first region.

16. The device of claim 14, where the processors is further to:
   nest one or more resource reservation protocol (RSVP) LSPs into the FA-LSP.

17. A system comprising:
one or more devices to:
   define a first region in a network based on a first link of the network,
      the first region being a multiprotocol label switching (MPLS) based region;
   define a second region in the network based on a second link of the network;
   determine that the first link is in the MPLS based region;
   define a boundary between the first region and the second region based on the first region and the second region; and
   create a label switched path (LSP) hierarchy based on the boundary,
      when creating the LSP hierarchy after determining that the first link is in the MPLS based region, the one or more devices are to:
         create, based on the boundary, a forwarding adjacency label switched path (FA-LSP) in the first region,
            the FA-LSP causing the first link and one or more other links of the first region to appear to be in the second region of the network.

18. The system of claim 17, where the one or more devices are further to:
   advertise the FA-LSP as a traffic engineering (TE) link to the second link and one or more other links of the second region.

19. A system comprising:
one or more devices to:
   determine whether a link is in a first region of the at least one MPLS network or a second region of the at least one MPLS network,
      the first region being associated with a first link color,
      the second region being associated with a second link color, and
      the second link color being different from the first link color;
   define a boundary between the first region and the second region based on the first link color and the second link color; and
   create a label switched path (LSP) hierarchy, in the at least one MPLS network, based on the defined boundary,
      when the link is in the second region, the one or more devices are to:
         create a forwarding adjacency label switched path (FA-LSP) that includes the link and that makes the link appear to be in the first region, and
      when the link is in the first region, the one or more devices are to:
         create a FA-LSP that includes the link and that makes the link appear to be in the second region.

20. The system of claim 19, where, when creating the FA-LSP that makes the link appear to be in the first region, the one or more devices are to:
   cause the link to appear to be in the first link color to one or more network devices in the first region.

* * * * *